United States Patent [19]
Harrison et al.

[11] Patent Number: 5,737,356
[45] Date of Patent: Apr. 7, 1998

[54] SPECTRAL SPREADING APPARATUS FOR REDUCING ELECTROMAGNETIC RADIATION FROM A TRANSMISSION LINE USED FOR HIGH DATA RATE COMMUNICATION IN A COMPUTERIZED TOMOGRAPHY SYSTEM

[75] Inventors: Daniel David Harrison; Richard Louis Frey, both of Delanson, N.Y.

[73] Assignee: General Electric Company, Schenectady, N.Y.

[21] Appl. No.: 414,814

[22] Filed: Mar. 31, 1995

[51] Int. Cl.⁶ .................................................. H04B 15/00
[52] U.S. Cl. ........................... 375/200; 340/500; 340/552
[58] Field of Search ........................... 375/200; 340/500, 340/552; 324/639; 342/451, 423, 357, 841; 378/4, 15

[56] References Cited

U.S. PATENT DOCUMENTS

| | | | |
|---|---|---|---|
| 3,475,558 | 10/1969 | Cahn | 375/200 |
| 4,179,658 | 12/1979 | Bitzer | 375/200 |
| 4,490,829 | 12/1984 | Van Etten | 375/200 |
| 4,914,674 | 4/1990 | Kimber et al. | 375/200 |
| 5,283,807 | 2/1994 | Graham | 375/200 |
| 5,530,422 | 6/1996 | Harrison | 340/500 |

OTHER PUBLICATIONS

"GE American Communications Commercial Operations System Users Guide", Section VI, Earth Station Requirements, pp. 2–3, Oct. 1993.

"Satellite Communication Systems Engineering 2nd Ed.", W.L. Pritchard et al., Section 7.4, Subsection 7.4.1 Signal-to-Noise Ratios, pp. 348–350, (C) 1993 by Prentice-Hall, Inc.

*Primary Examiner*—Stephen Chin
*Assistant Examiner*—Joseph Roundtree
*Attorney, Agent, or Firm*—Donald S. Ingraham

[57] ABSTRACT

Apparatus for reducing electromagnetic radiation from a differentially driven transmission line for high data rate communication in a computerized tomography system is provided. The apparatus comprises a carrier generator, for generating a carrier signal having a predetermined carrier bandwidth. A modulator is respectively coupled to the carrier generator for receiving the carrier signal and for receiving an externally-derived data signal to produce a modulated output signal. The carrier bandwidth is sufficiently broad relative to a predetermined inspection bandwidth for substantially reducing the level of electromagnetic energy being measured over the inspection bandwidth.

16 Claims, 6 Drawing Sheets

SPECTRAL SPREADING APPARATUS FOR REDUCING ELECTROMAGNETIC RADIATION FROM A TRANSMISSION LINE USED FOR HIGH DATA RATE COMMUNICATION IN A COMPUTERIZED TOMOGRAPHY SYSTEM

BACKGROUND OF THE INVENTION

The field of the present invention is generally related to computerized tomography (CT) and, more particularly, to an apparatus using spectral spreading techniques for reducing electromagnetic radiation from a transmission line used for providing high data rate communication in a CT system.

CT systems typically employ a rotating frame or gantry to obtain multiple x-ray images, or views, at different rotational angles. Each set of images is referred to in the art as a "slice". A patient or inanimate object is generally positioned in a central opening of the rotating frame on a table which is movable axially, thus enabling respective slices to be obtained at multiple axial positions as well. Each of the slices obtained is then processed in a computer according to predetermined algorithms to produce enhanced images for diagnostic or inspection purposes.

The rotating frame includes an x-ray source, a detector array and electronics necessary to generate image data for each view. A set of stationary electronics is employed for processing raw image data into the enhanced form. Thus, it is necessary to provide for communication of the image data between the rotating frame and a stationary frame of the CT system.

The data rate for communication between the stationary and rotating frames is an important factor because it is desirable to obtain the desired views as fast as possible to reduce patient discomfort and/or to maximize equipment utilization. In current CT systems, a single view typically comprises about 800 detector channels with a 16 bit representation for each individual detector channel output (i.e., 12.8 Kbits per view) and is typically repeated 1,000 times per second, yielding a net data rate requirement of approximately 13 Megabits per second (Mbit/sec) for image data alone. Future CT systems capable of simultaneously constructing multiple image slices by employing four, eight, or sixteen times as many detector channels will increase the data rate requirement to beyond 150 Mbit/sec for image data alone.

Prior CT systems have employed brushes and slip rings for electrically linking the rotating frame to the stationary frame. However, in general, CT systems utilizing brushes and slip rings for communications have generally suffered from significant limitations in the data rates which can be achieved. This is due to the substantial time required to propagate the signals around the circular slip rings. At the desired data rates, the electrical path length around the rings is an appreciable fraction of a bit period, so that electromagnetic waves propagating around the rings in opposite directions may arrive at a reception point at substantially different times in a bit period, causing garbled reception.

U.S. Pat. No. 5,208,581 issued to A. K. Collins, assigned to the assignee of the present invention and herein incorporated by reference, is another type of gantry in which brushes and slip rings are employed for communication. Although the design of Collins provides relatively high speed communication between the stationary and rotating frames, the fact remains that the use of contacting brushes and rings inherently carries certain disadvantages. For example, the mechanical contact between the brushes and rings causes wear which requires such brushes and rings to be periodically replaced in order to maintain reliable communication. Furthermore, the slip-ring design of Collins does not support the higher data rates needed for multiple-slice CT systems.

Other CT systems have employed an optical data link for communication between the stationary and rotating frames. Although an optical data link design avoids typical drawbacks of slip rings and brushes, such optical design requires optics which must be fabricated under tight specifications and which in operation require substantial spatial alignment in order to achieve reliable optical coupling along the relatively long circumference of the rotating frame. This leads to high costs and, thus, it is desirable to provide in a CT system an improved communication link which at a low cost provides reliable high data rate communication between the stationary and rotating frames of the CT system.

It is further desirable to provide a communication link between the stationary frame and the rotating frame which is robust with respect to electromagnetic radiation interference such as is typically produced in a hospital environment by cellular telephones, defibrillating devices, surgical saws and even electrical noise produced by any given CT system. Furthermore, it is also desirable to reduce the level of electromagnetic energy which is radiated from such communication link in order to comply with governmental regulations, such as regulations imposed by the Federal Communications Commission and/or foreign governments. For instance, electromagnetic emission limits could require that the power level measured or inspected in any 130 KHz bandwidth segment between 250 MHz and 1000 MHz be less than 44 dB micro-volts per meter at a distance of 10 meters from an offending radiator. As used herein any such bandwidth segment is referred as the "inspection bandwidth." As described in U.S. Pat. No. 5,530,424 a transmission line and a coupler or probe provide means for implementing such high data rate communication link. As further described in U.S. Pat. No. 5,530,422, a differentially driven transmission line and coupler allow for substantially avoiding electromagnetic radiation around the coupler. Although the differential techniques described in U.S. Pat. No. 5,630,422 advantageously reduce some electromagnetic radiation around the coupler as the coupler moves relative to the transmission line, it is desirable to further reduce the level of radiated power being measured over any given inspection bandwidth by spreading or distributing the power spectrum over the inspection bandwidth. Each of the above-identified US patent applications is assigned to the assignee of the present invention and is herein incorporated by reference.

SUMMARY OF THE INVENTION

Generally speaking, the present invention fulfills the foregoing needs by providing an apparatus for reducing electromagnetic radiation from a transmission line, such as a differentially driven transmission line used for providing high data rate communication in a computerized tomography system. The apparatus comprises a carrier generator for generating a carrier signal having a predetermined carrier bandwidth. Modulating means, such as a balanced modulator, is respectively coupled to the carrier generator for receiving the carrier signal and for receiving an externally-derived data signal to produce a modulated output signal. The carrier bandwidth is sufficiently broad relative to a predetermined inspection bandwidth for substantially reducing the level of electromagnetic energy being measured over the inspection bandwidth. The present invention advantageously enables compliance with governmental regulations for electromagnetic emission limits.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like numbers represent like parts throughout the drawings, and in which:

FIG. 5A shows power spectrum characteristics of an output signal without spectral spreading, whereas

DETAILED DESCRIPTION OF THE INVENTION

Figure 1:
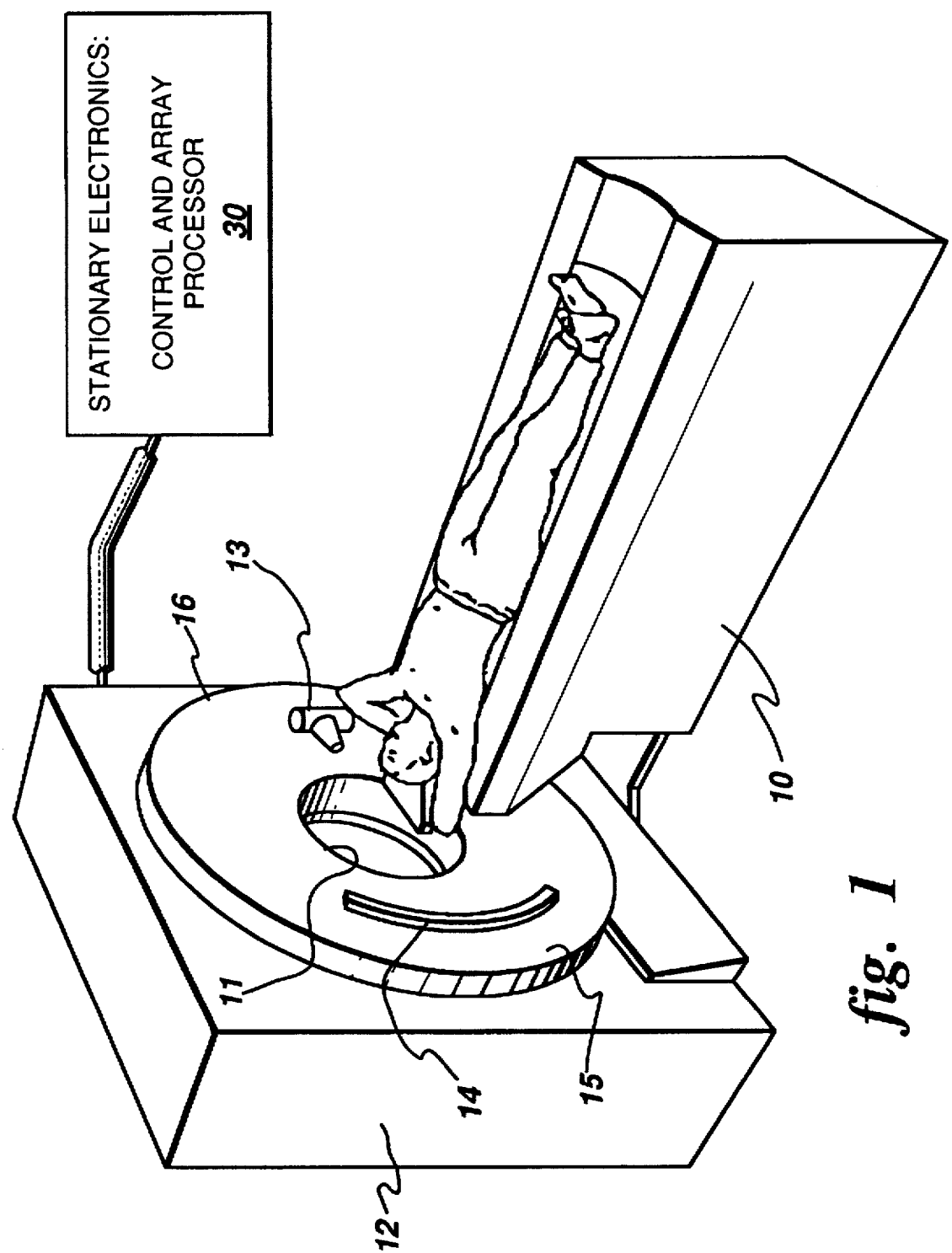
FIG. 1 is a perspective view of a CT system which employs the present invention.

As shown in FIG. 1, a CT system used to produce images of at least a region of interest of the human anatomy has a patient table 10 which can be positioned within the aperture 11 of a generally annular rotating frame or gantry 15 having a predetermined circumference, e.g., outer circumference 16. A stationary frame 12 is conveniently employed to support rotating frame 15. A source of imaging energy 13 which preferably produces highly collimated x-rays is mounted on the rotating frame to one side of its aperture 11, and a detector array 14 is mounted to the other side of the aperture. The rotating frame, together with x-ray source 13 and detector array 14, is revolved about the aperture during a scan of the patient to obtain x-ray attenuation measurements from many different angles through a range of at least 180° of revolution. Detector array 14 may comprise multiple rows each having about 800 detector channels along its length. The individual outputs of each channel in detector array 14 is connected to a data acquisition system, DAS (not shown). When sampled, each channel output is converted by the DAS to, for example, a 16 bit digital value representing X-ray intensity.

The rotating frame further includes additional onboard electronics (not shown) which rotates along with rotating frame 15. The onboard electronics is essentially a slave to stationary electronics systems 30 which is located off rotating frame 15. Stationary electronics systems 30 is a computer-based system for issuing commands to the onboard electronics on rotating frame 15 and for receiving the resulting image data, via suitable electrical leads from stationary frame 12, to perform processing of the received image data.

The present invention is directed to apparatus using spectral spreading modulation techniques for reducing electromagnetic radiation from a transmission line, such as a differentially driven transmission line, that provides high data rate communication in a computerized tomography system. Although the present invention is described in terms of a differentially driven transmission line, it will be appreciated by those skilled in the art that single-ended implementations for the transmission line can also readily benefit from the spectral spreading modulation techniques described herein and thus the present invention is not limited to a differentially-driven transmission line. The high data rate communication is noncontactively provided between the rotating frame and the stationary frame through radio coupling between the differentially driven transmission line and a differential coupler. This advantageously avoids the use of slip rings and brushes and allows for continuous rotation of rotating frame 15. As discussed above, multiple-slice CT systems require high data rate communication which is reliable, and which is in compliance with electromagnetic emission regulations. The present invention advantageously allows for such high data rate communication, (e.g., exceeding 150 Mbits/sec.) while reducing the radiated power spectral density of the communication signal through the use of spectral spreading modulation techniques. This high data rate communication is conveniently implemented without the use of brushes and slip rings or without the use of costly optical devices. Further, the present invention allows for reliable and cost effective high data rate communication notwithstanding the relatively long circumference (approximately 13 ft) of the rotating frame.

In the discussion which follows, it is assumed that all of the communication between rotating frame 15 and stationary frame 12 has been serialized, i.e., converted from parallel to serial data for transmission and vice versa on reception, employing well known multiplexing techniques. This is done so that only a single bit stream need be transmitted, although it should be apparent to those skilled in the art that multiple parallel paths according to the present invention could be employed. In each case, multilevel or multiphase encoding techniques can be employed to further increase the maximum data rate available.

Figure 2:
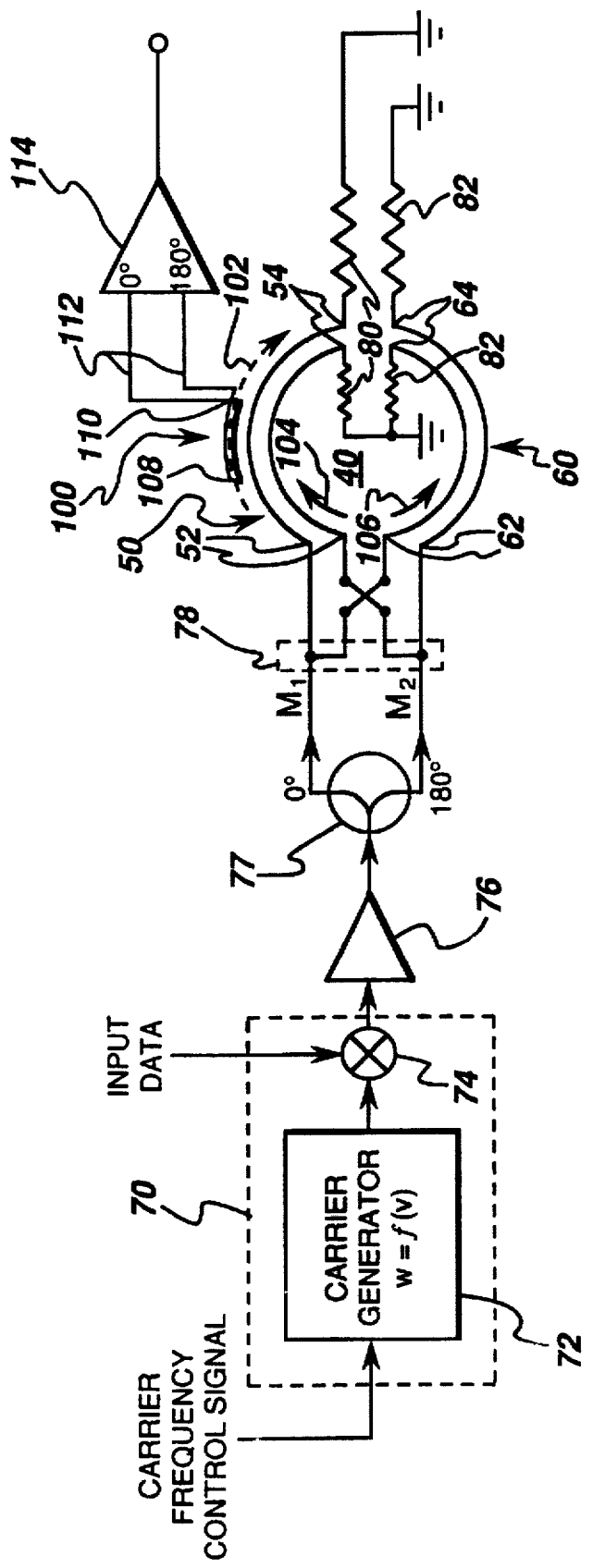
FIG. 2 is a simplified schematic representation of an apparatus having a carrier generator which provides spectral spreading in accordance with the present invention, and including a differentially-driven transmission line and a coupler.
Figure 4:
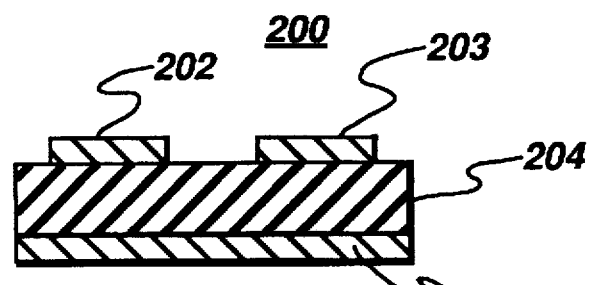
FIG. 4 shows a cross section of a microstrip which can be utilized for the differentially driven transmission line and/or coupler shown in FIG. 2.

As shown in FIG. 2, a differentially driven transmission line 40 is attached to rotating frame 15 (FIG. 1) and is positioned substantially around the rotating frame, for example, around the circumference of the rotating frame. Similarly, the transmission line can be conveniently affixed to the annulus of the rotating frame, i.e., the surface bounded by the concentric circles in the rotating frame; for example, the concentric circle which defines aperture 11 and the larger concentric circle which has circumference 16. Further, it will be appreciated that the transmission line need not be limited to circular geometric arrangements since geometric arrangements other than circular can equally benefit from the present invention. By way of example, transmission line 40 comprises respective individual segments 50 and 60 each having a respective first end 52 and 62, and a respective second end 54 and 64. In FIG. 2, each respective individual segment is represented by twin lines since, as shown in FIG. 4 by way of example and not of limitation, each of the individual segments comprises microstrip transmission lines having respective signal conductors for carrying respective signals being substantially out-of-phase with respect to one another, that is, each segment may comprise microstrip transmission lines that are differentially driven. Preferably, each individual segment 50 and 60 has a respective electrical length chosen so that a modulated signal applied at each respective first end 52 and 62 has a predetermined time-delay upon arrival at each respective second end 54 and 64. It will be appreciated that if the respective electrical lengths for segments 50 and 60 are substantially similar to one another, the above-described segment arrangement results in the modulated signal arriving at each respective second end with a substantially similar time delay relative to one another.

FIG. 2 further shows an apparatus 70 that advantageously and in accordance with the present invention allows for reducing electromagnetic radiation from the differentially driven transmission line through the use of spectral spreading modulation techniques. By way of example, apparatus 70 can be conveniently mounted on rotating frame 15 as part of the onboard electronics. Apparatus 70 comprises a carrier generator 72 designed to generate a carrier signal having a predetermined carrier bandwidth. The carrier bandwidth is chosen to be sufficiently broad relative to a predetermined inspection bandwidth for substantially reducing the level of electromagnetic energy being measured over the inspection bandwidth. Modulating means, such as a balanced modulator 74, is coupled to carrier generator 72 for receiving the carrier signal and for receiving input data, such as image data and the like, to produce a modulated output signal M having a power spectral density being substantially spread or distributed over any given inspection bandwidth, thus reducing peak levels of electromagnetic radiation therein. An amplifier 76 can be optionally employed to provide any desired amplification to the modulated output signal from modulator 74. A phase splitter 77 is coupled to receive the modulated output signal for generating first and second modulated constituent carrier signals $M_1$ and $M_2$ being substantially out-of-phase (i.e., 180° out-of-phase) relative to one another. Thus, in operation, apparatus 70 conveniently allows for reducing electromagnetic radiation by spreading or distributing the power spectral density of the modulator output signal. The carrier signal can be data modulated in modulator 74 by employing any of a number of readily available modulation techniques, such as pulse amplitude modulation, frequency-shift keying and the like, provided the chosen data modulation is distinguishable from the spectrum spreading modulation. For example, the data modulation and the spectrum modulation could be conveniently chosen to be mutually orthogonal relative to one another. It will be appreciated that for pulse amplitude modulation, modulator 74 can conveniently comprise a switching gate that allows the carrier signal from carrier generator 72 to pass through the switching gate, depending on the respective logic values for the data bits that make up the input data to the switching gate. For example, whenever any data bit has a logic value of "one", this could cause the switching gate to be in a conducting state that enables the switching gate to pass the carrier signal; whereas whenever any data bit has a logic value of "zero", this could cause the switching gate to be in a nonconducting state which effectively prevents the carrier signal from passing through the switching gate. See chapters 5 and 6 of textbook entitled "Principles of Communication Systems" by H. Taub and D. L. Schilling, published by the McGraw-Hill Book Company and herein incorporated by reference for additional details of various pulse-code modulation techniques that could be readily employed in modulator 74. The respective first and second modulated constituent signals $M_1$ and $M_2$ supplied by phase splitter 77 can in turn be readily split or divided by a suitable dividing network 78 into one or more sets of modulated differential signals. For example, as shown in FIG. 2, the first and second modulated signals are split into two respective sets of modulated differential signals so that one differential signal set is supplied to one of the respective transmission line segments while the other differential signal set is supplied to the other one of the transmission line segments. It will be appreciated that the respective functions provided by dividing network 78 and phase splitter 77 could be readily reversed, depending upon the specific requirements for any given implementation. For example, signal splitting, without 180° phase shifting, such as performed by dividing network 78, could be implemented prior to the 180° phase shifting imparted by phase splitter 77. Further, any desired signal conditioning, such as impedance matching, can be readily provided in a signal conditioning circuit (not shown) which can include matching resistors having a predetermined resistance value selected to match the impedance characteristics of the respective transmission line segments. As shown in FIG. 2, each modulated differential signal set from dividing network 78 is respectively connected to each respective first end 52 and 62. Similarly, each respective second end 54 and 64 is respectively connected to termination resistors 80 and 82 having a predetermined resistance value chosen to minimize reflection of energy in individual transmission line segments 50 and 60. Other arrangements may be employed which, although having some difference in time delay between individual segments, such time-delay difference can be tolerated depending on the specific application. For example, one of the differential signal sets could be respectively connected to each respective second end 64 in lieu of each first end 62, and termination resistors 82 could be respectively connected to each first end 62 in lieu of each second end 64. In this case, although a predetermined time delay would exist between the individual segments, such time delay difference could be acceptable in certain applications.

Individual segments 50 and 60 are preferably arranged so that respective first ends of any two consecutive segments are substantially adjacent to one another and respective second ends of any two consecutive segments are substantially adjacent to one another. The gap size between any two consecutive segments should be small relative to carrier wavelength. For example, about ⅛ in. for a 750 MHz carrier. This arrangement conveniently allows for avoiding time-delay discontinuities between any of the respective individual segments encircling the rotating frame. This allows for effective coupling operation between the transmission line and the coupler at all rotation angles. As shown in FIG. 2, each of the two individual segments 50 and 60 can be designed to subtend a respective angle of about 180° around the circumference of the rotating frame. In general, it will be appreciated that a number of N individual segments each respectively subtending an angle of about 360°/N around the circumference of the rotating frame wherein N is a predetermined even number will be equally effective in alternative embodiments of the present invention since the modulated differential signal (i.e., the net result of the respective modulated signals being substantially out-of-phase with respect to one another) in each case is available for reception anywhere along the circumference of the rotating frame including any gaps between any of the N individual segments. As suggested above, there may be applications which can tolerate a predetermined time delay difference between the individual segments. In this case, the N number of individual segments need not be limited to an even number since a predetermined odd number of individual segments, including a single segment, could be effectively utilized for applications which tolerate such predetermined time delay difference. The foregoing construction for the individual segments assumes that each segment is made up of a material having a substantially similar dielectric constant. However, it will be apparent that segment materials having predetermined different dielectric constants can also be conveniently employed. In this case, the angle subtended by each respective individual segment need not be identical to each other.

FIG. 2 further shows a coupler, such as a differential coupler 100 attached to stationary frame 12 (FIG. 1) and being positioned sufficiently near the differentially driven transmission line for establishing radio coupling therebetween in order to receive the modulated differential signal being applied to the respective individual segments. As used herein the expression "radio coupling" refers to noncontactive transfer of energy by electromagnetic radiation at radio frequencies.

It will be appreciated that coupler 100, comprising a first coupler signal conductor 101 and a second coupler signal conductor 103 has a predetermined length dimension along a coupler axis 102 which, for example, can be substantially parallel relative to individual segments 50 and 60. The coupler length dimension is conveniently chosen to be sufficiently short to substantially avoid frequency-dependent directional coupling effects, and to be sufficiently long to avoid substantial signal reduction in coupler 100 whenever the coupler passes about any gap between respective ones of the individual segments. As indicated by arrows 104 and 106, the modulated differential signal applied to respective segments 50 and 60 propagates in opposite directions and thus to avoid blind spots near any of the gaps, coupler 100 preferably has a first end 110 directly connected to output port means 112, such as a coaxial line pair or other suitably shielded electrical conductor pair, and has a second end 108 which is substantially free of any termination impedance, i.e., termination resistors. In this manner, the modulated differential signal received by coupler 100 passes to coaxial line pair 112 independently of the propagation direction of the received modulated differential signal, i.e., independently of the propagation direction of the respective electromagnetic waves traveling in individual segments 50 and 60. For instance, waves arriving at second end 108 readily propagate toward the first end and from there to coaxial line pair 112, whereas waves arriving at first end 110 are eventually reflected back from the resistively unterminated second end 108 toward the first end and from there to coaxial line pair 112. In each case, differential coupler 100 advantageously allows for noncontactively extracting the respective substantially out-of-phase signals which constitute the modulated differential signal in the transmission line along the full circumference of the rotating frame. An amplifier 114 can readily provide a predetermined amplification to the respective substantially out-of-phase signals being supplied by differential coupler 100. As will be appreciated by those skilled in the art, the length dimension of the coupler can vary depending on the specific frequency range being swept by the modulated signal. By way of example and not of limitation, the coupler length dimension can be chosen in the range of λ/4 to λ/8 wherein λ represents the wavelength of the carrier in the transmission line material. Other configurations for the coupler will be readily apparent to those skilled in the art. For example, a relatively short (e.g., about λ/16) center-tapped coupler can alternatively be employed in lieu of a coupler having a resistively unterminated end.

Figure 3:
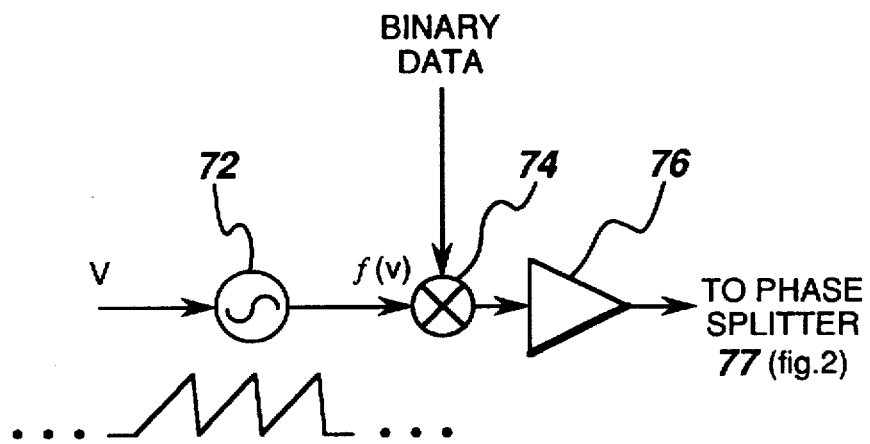
FIG. 3 shows a simplified schematic for an exemplary embodiment of the carrier generator shown in FIG. 2.

FIG. 3 shows a carrier generator 72 that comprises a voltage-controlled oscillator whose frequency of oscillation, w, can be predeterminedly varied by changing an eternally-derived control signal, such as a voltage signal v, applied to carrier generator 72. Thus, frequency w is a function of the applied voltage signal, i.e., w=f(v). The frequency w is preferably linearly swept over a frequency range of interest, such as the frequency range for the carrier bandwidth, by selecting the externally-derived control signal applied to the carrier generator as a sawtooth waveform. The reduction in the power spectral density of a narrow band data source component afforded by a linear sweep of a relatively narrow oscillator signal can be characterized as follows:

$$10 \log_{10} \left[ \frac{f_u - f_l}{BW_i} \right],$$

wherein $f_u$ and $f_l$ respectively, represent the respective upper and lower limits of the sweep frequency range and $BW_i$ represents the predetermined inspection bandwidth over which power levels are inspected or examined. It will be appreciated that other waveforms can also be effective for achieving substantial spreading of the power spectral density of the output signal supplied by modulator 74. For example, the externally derived control signal applied to the carrier generator could be chosen as a triangular, or a sinusoidal waveform in lieu of a sawtooth waveform. In one exemplary implementation, a broad band carrier centered at 750 MHz was generated using a 10 KHz sawtooth waveform that swept the original carrier over a frequency range from 750 MHz to 780 Mhz. Further, as will be appreciated by those skilled in the art, the eternally-derived control signal applied to carrier generator 72 can be chosen as a voltage signal made up of random noise. In operation, carrier generator 72 allows for reducing peaks in the communication signal, i.e., the signal which propagates in the transmission line and which is eventually noncontactively transmitted to coupler 100 (FIG. 2). It will be appreciated that the maximum useful spreading of the carrier is limited by the spacing of the peaks (which would exist in the communication signal if no carrier spreading was provided in accordance with the present invention), and by the ratio of the spectral peak values to the broad band power spectral density between peaks.

FIG. 4 illustrates a cross section of a substantially planar transmission line which can be effectively used both for the differentially driven transmission line segments and for the differential coupler. For example, FIG. 4 shows a microstrip 200 wherein substantially parallel first and second signal conductors 202 and 203 and a ground plane 206 are separated from one another by a suitable dielectric material 204. It will be appreciated that such substantially planar transmission line can be readily fabricated employing well-known printed circuit techniques which allow for substantial savings in cost as compared to an optical data link. For additional details such as mode characteristics of the exemplary planar transmission line shown in FIG. 4 and other parallel line devices, see pp. 199–208 of textbook entitled "Microwave Planar Passive Circuits And Filters" by J. Helszajn, published by John Wiley & Sons. Similarly, a stripline transmission line wherein the first and second signal conductors are "sandwiched" in a respective dielectric material between two ground planes can be alternatively employed both for the transmission line segments and for the coupler. A basic construction for a Stripline transmission line is shown in FIG. 3b of the above incorporated by reference U.S. Pat. No. 5,530,422. Furthermore, the coupler need not consist of a microstrip or a stripline transmission line. A suitable conductor, such as a short piece of twin wires, aligned substantially parallel to the driven transmission line, will also work effectively.

Figure 5A:
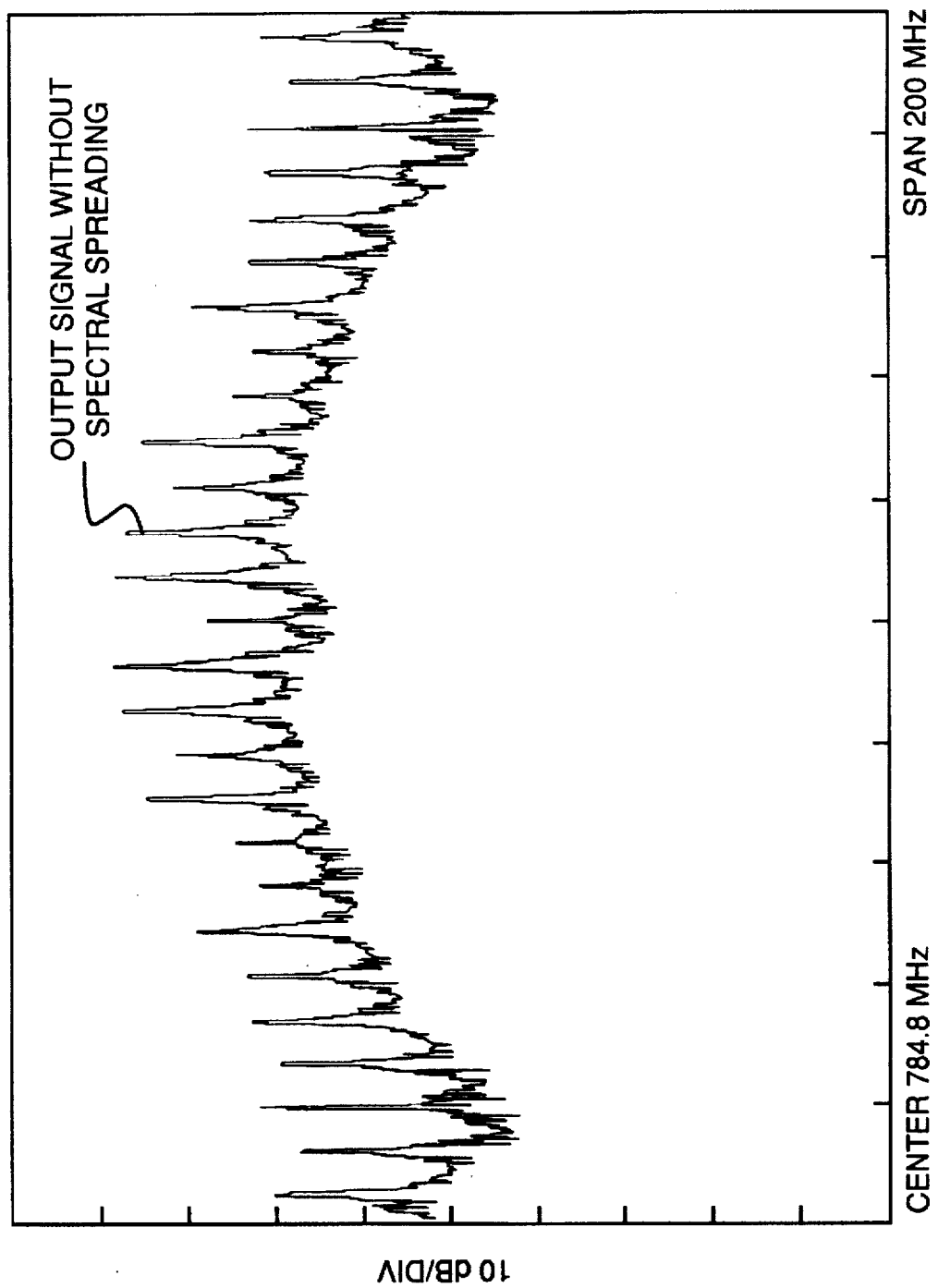
Figure 5B:
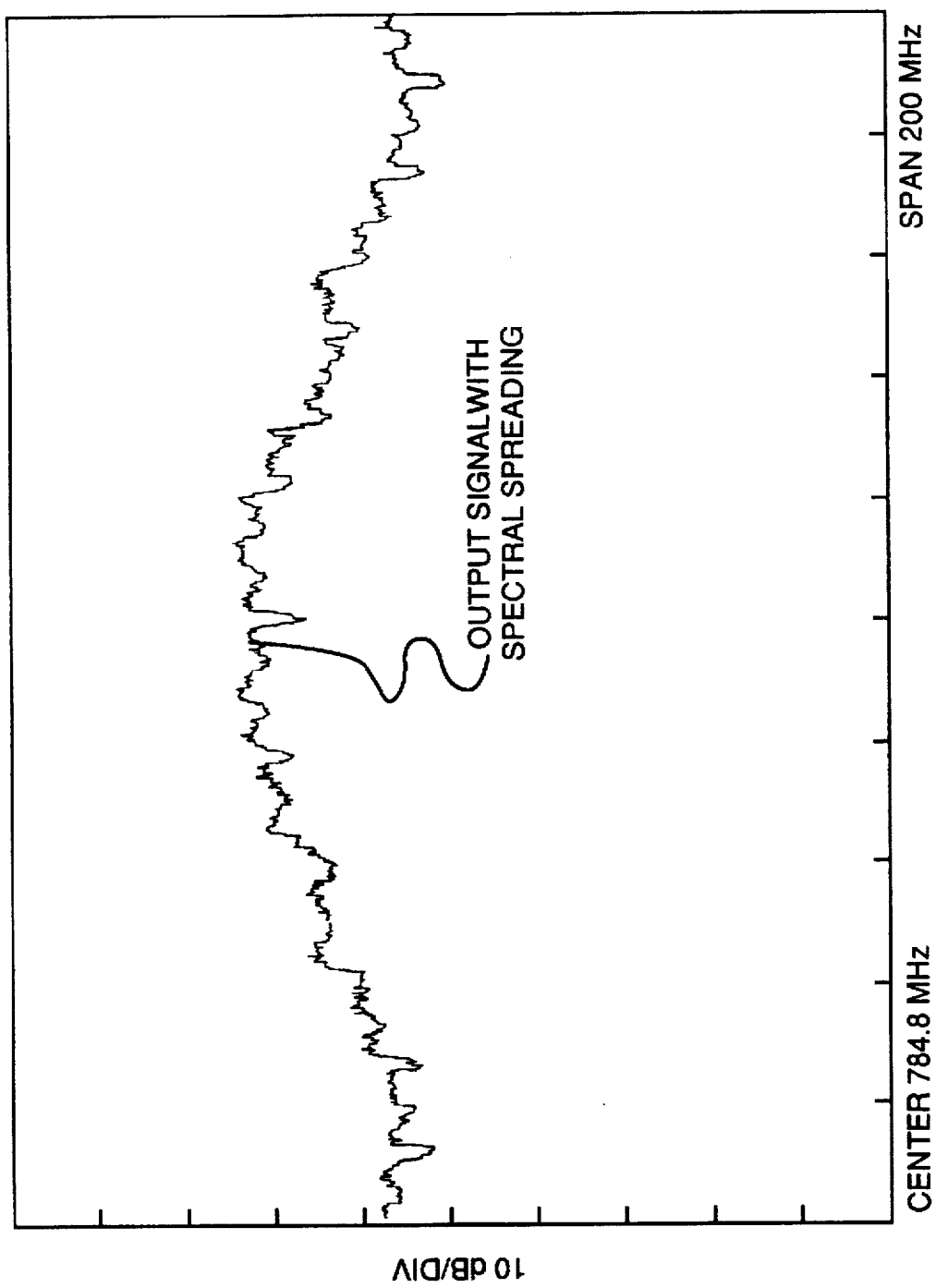
FIG. 5B shows power spectrum characteristics of an output signal with spectral spreading in accordance with the present invention.

FIG. 5A is a plot that shows an exemplary power spectral density of a modulator output signal without spectral spreading, i.e., the carrier bandwidth is essentially zero. FIG. 5B is a plot that shows an exemplary power spectral density with spectral spreading in accordance with the present invention. The narrow spectral components or peaks, above the broad background component (shown in FIG. 5A) are advantageously reduced by providing a broad band carrier, as discussed in the context of FIG. 3 and as shown in FIG. 5B. In this example, it can be seen that the spectral spreading modulation technique advantageously provides approximately 14 dB peak attenuation reduction versus the signal without spectral spreading.

Figure 6:
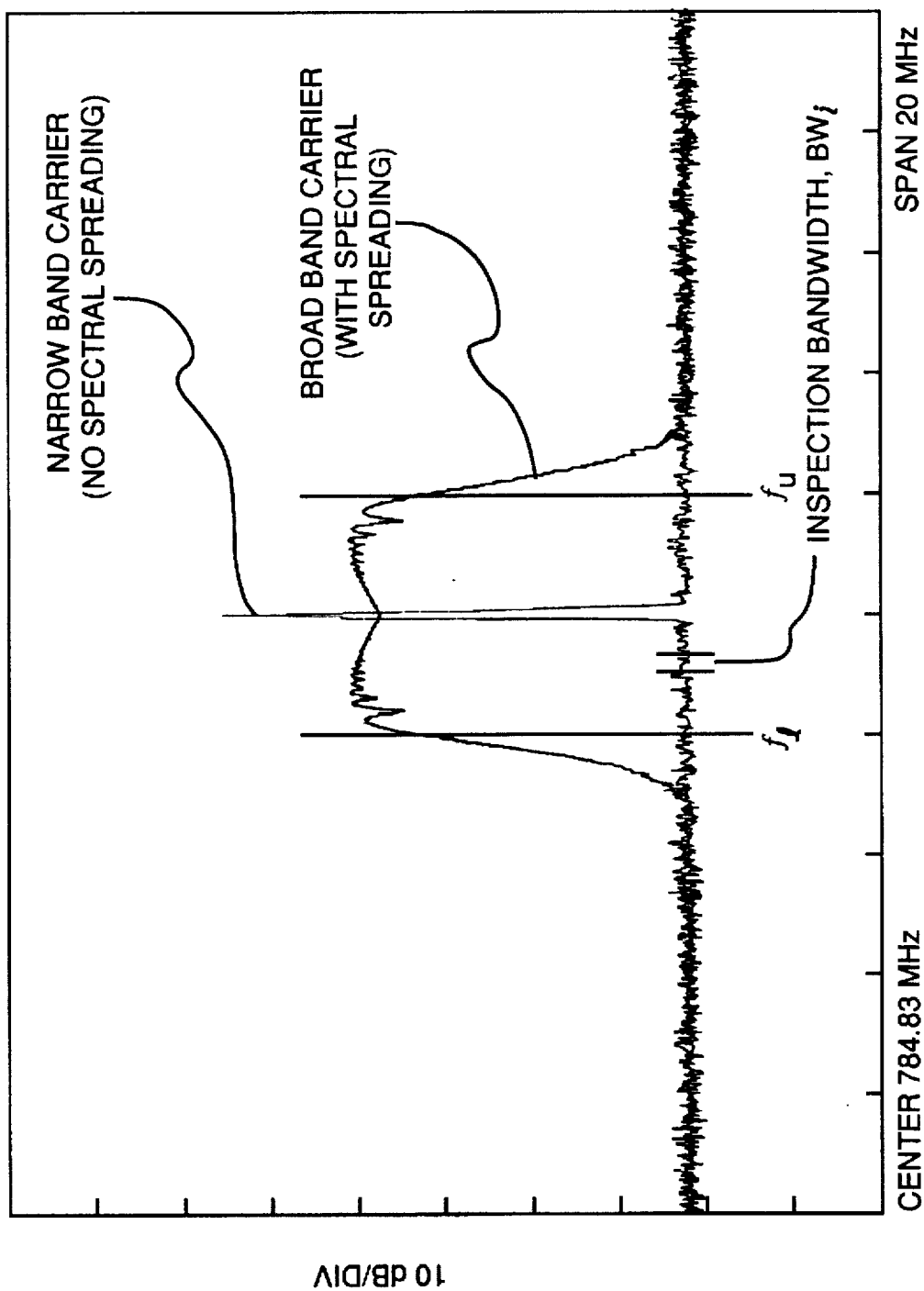
FIG. 6 shows a plot that compares respective exemplary spectral characteristics of a narrow band carrier versus a broad band carrier in accordance with the present invention.

FIG. 6 is an exemplary plot that conveniently compares respective exemplary spectral characteristics of a narrow band carrier, such as would be obtained if no spectral spreading was provided, versus a broad band carrier, such as is advantageously obtained using a carrier generator 72 (FIGS. 2 and 3) that provides spectral spreading in accordance with the present invention.

Although various specific constructions have been given for the present invention, it is to be understood that these are for illustrative purposes only. Various modifications and adaptations will be readily apparent to those skilled in the art without departing from the substance or scope of the invention. For example, although the transmission line segments have been described as rotating along with rotating frame or gantry 15 (FIG. 1) and the coupler has been described as attached to stationary frame 12 (FIG. 1), it is equally possible to instead have the transmission line segments stationary and the coupler mounted on the rotating frame, i.e., stationary and rotating mechanical mounting for the coupler and transmission line segments can be readily interchanged with equally effective results. Accordingly, it is intended that the invention be limited only by the spirit and scope of the claims appended hereto.

What is claimed is:

1. A computerized tomography system comprising:

a carrier generator for generating a carrier signal having a predetermined carrier bandwidth, said carrier bandwidth being sufficiently broad relative to a predetermined inspection bandwidth for substantially reducing the level of electromagnetic radiation being measured over said inspection bandwidth;

modulating means respectively coupled to said carrier generator for receiving said carrier signal and for receiving an externally-derived data signal to produce a spread spectrum modulated output signal;

a phase splitter coupled to said modulating means for generating first and second modulated constituent signals being substantially out-of-phase relative to one another;

a transmission line having first and second signal conductors coupled to said phase splitter to respectively receive said first and second modulated constituent signals; and a coupler having a first coupler signal conductor and having a second coupler signal conductor positioned sufficiently near said propagating in said transmission line transmission line for establishing radio coupling therebetween so as to receive said first and said second respective modulated constituent signals propagating in said transmission line.

2. The computerized tomography system of claim 1 wherein said carrier generator comprises a voltage-controlled oscillator.

3. The computerized tomography system of claim 2 wherein the carrier signal generated by said voltage-controlled oscillator has a frequency that varies linearly with time over said carrier bandwidth.

4. The computerized tomography system of claim 3 wherein the externally-derived control signal applied to said carrier generator comprises a sawtooth waveform.

5. The computerized tomography system of claim 2 wherein the externally-derived control signal applied to said carrier generator comprises a triangular waveform.

6. The computerized tomography system of claim 2 wherein the externally-derived control signal applied to said carrier generator comprises a random noise waveform.

7. The computerized tomography system of claim 2 wherein said modulating means comprises a balanced modulator.

8. The computerized tomography system of claim 2 wherein said modulating means comprises a switching gate.

9. Apparatus for reducing electromagnetic radiation from a transmission line for providing high data rate communication in a computerized tomography system, said apparatus comprising:

a carrier generator for generating a carrier signal having a predetermined carrier bandwidth, said carrier bandwidth being sufficiently broad relative to a predetermined inspection bandwidth for substantially reducing the level of electromagnetic radiation being measured over said inspection bandwidth; and modulating means respectively coupled to said carrier generator for receiving said carrier signal and for receiving an externally-derived data signal to produce a modulated output signal wherein said modulated output signal comprises a spread spectral density of said first and said second modulated constituent signals so as to reduce electromagnetic radiation in said transmission line.

10. The apparatus of claim 1 wherein said carrier generator comprises a voltage-controlled oscillator.

11. The apparatus of claim 10 wherein the carrier signal generated by said voltage-controlled oscillator has a frequency that varies linearly with time over said carrier bandwidth.

12. The apparatus of claim 11 wherein the externally-derived control signal applied to said carrier generator comprises a sawtooth waveform.

13. The apparatus of claim 11 wherein the externally-derived control signal applied to said carrier generator comprises a triangular waveform.

14. The apparatus of claim 10 wherein the externally-derived control signal applied to said carrier generator comprises a random noise waveform.

15. The apparatus of claim 10 wherein said modulating means comprises a balanced modulator.

16. The apparatus of claim 10 wherein said modulating means comprises a switching gate.

* * * * *